(12) United States Patent
Kumnick et al.

(10) Patent No.: US 9,978,064 B2
(45) Date of Patent: May 22, 2018

(54) HOSTED THIN-CLIENT INTERFACE IN A PAYMENT AUTHORIZATION SYSTEM

(71) Applicant: Visa International Service Association, Foster City, CA (US)

(72) Inventors: Phil Kumnick, Foster City, CA (US); Sonika Chandra, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 663 days.

(21) Appl. No.: 13/731,500

(22) Filed: Dec. 31, 2012

(65) Prior Publication Data

US 2013/0179346 A1    Jul. 11, 2013

Related U.S. Application Data

(60) Provisional application No. 61/582,202, filed on Dec. 30, 2011.

(51) Int. Cl.
*G06Q 20/40* (2012.01)
*G06Q 20/12* (2012.01)

(52) U.S. Cl.
CPC ..... *G06Q 20/40145* (2013.01); *G06Q 20/123* (2013.01); *G06Q 20/40* (2013.01)

(58) Field of Classification Search
CPC ..................................................... G06Q 20/40
See application file for complete search history.

(56) References Cited

U.S. PATENT DOCUMENTS

| | | |
|---|---|---|
| 5,399,874 A | 3/1995 | Gonsalves et al. |
| 5,613,012 A | 3/1997 | Hoffman et al. |

(Continued)

FOREIGN PATENT DOCUMENTS

| | | |
|---|---|---|
| AU | 750154 B2 | 7/2002 |
| JP | 2009-099004 A | 5/2009 |

(Continued)

OTHER PUBLICATIONS

U.S. Appl. No. 10/678,646, filed Oct. 6, 2003, Robinson.

(Continued)

*Primary Examiner* — Bruce I Ebersman
*Assistant Examiner* — David P Sharvin
(74) *Attorney, Agent, or Firm* — Kilpatrick Townsend & Stockton LLP

(57) ABSTRACT

A methods and system of hosted thin-client payment authorization and authentication services for processing payments for value-added service (VAS) providers is described. A method, performed by a host server operating a thin-client device, includes receiving transaction request data at a host server computer from a thin-client device, where the transaction request data can include financial account data and biometric data. The host-server transmits a verification request message to a VAS provider and receives an indication that it is a valid merchant. The host-server transmits an authorization request message comprising the biometric data to a payment processing network (PPN), where the PPN communicates with an authentication server computer to validate the biometric data, sends the authorization request message to an issuer and receives an authorization response message from the issuer. The host-server receives the authorization response message from the PPN and sends a service fulfillment request to the VAS provider.

10 Claims, 9 Drawing Sheets

(56) References Cited

U.S. PATENT DOCUMENTS

| | | |
|---|---|---|
| 5,615,277 A | 3/1997 | Hoffman |
| 5,668,897 A | 9/1997 | Stolfo |
| 5,737,439 A | 4/1998 | Lapsley et al. |
| 5,764,789 A | 6/1998 | Pare et al. |
| 5,785,353 A | 7/1998 | Diamond |
| 5,802,199 A | 9/1998 | Pare et al. |
| 5,805,719 A | 9/1998 | Pare et al. |
| 5,838,812 A | 11/1998 | Pare et al. |
| 5,870,723 A | 2/1999 | Pare et al. |
| 5,974,548 A | 10/1999 | Adams |
| 5,982,914 A | 11/1999 | Lee et al. |
| 6,012,039 A | 1/2000 | Hoffman et al. |
| D425,873 S | 5/2000 | Anderson et al. |
| 6,131,464 A | 10/2000 | Pare et al. |
| 6,154,879 A | 11/2000 | Pare et al. |
| 6,192,142 B1 | 2/2001 | Pare et al. |
| 6,209,104 B1 | 3/2001 | Jalili |
| 6,230,148 B1 | 5/2001 | Pare et al. |
| 6,233,684 B1 | 5/2001 | Stefik |
| 6,269,348 B1 | 7/2001 | Pare et al. |
| 6,314,521 B1 | 11/2001 | Debry |
| 6,351,815 B1 | 2/2002 | Adams |
| 6,366,682 B1 | 4/2002 | Hoffman et al. |
| 6,397,198 B1 | 5/2002 | Hoffman et al. |
| 6,411,728 B1 | 6/2002 | Lee et al. |
| 6,487,301 B1 | 11/2002 | Zhao |
| 6,510,453 B1 | 1/2003 | Apfel et al. |
| 6,567,530 B1 | 5/2003 | Keronen et al. |
| 6,581,042 B2 | 6/2003 | Pare et al. |
| 6,591,002 B2 | 7/2003 | Lee et al. |
| 6,594,376 B2 | 7/2003 | Hoffman et al. |
| 6,662,166 B2 | 12/2003 | Pare et al. |
| 6,728,397 B2 | 4/2004 | McNeal |
| 6,785,815 B1 | 8/2004 | Serret-Avila et al. |
| 6,862,583 B1 | 3/2005 | Mazzagatte et al. |
| 6,879,966 B1 | 4/2005 | Lapsley et al. |
| 6,920,435 B2 | 7/2005 | Hoffman et al. |
| 6,950,810 B2 | 9/2005 | Lapsley et al. |
| 6,957,770 B1 | 10/2005 | Robinson |
| 6,980,670 B1 | 12/2005 | Hoffman et al. |
| 6,985,608 B2 | 1/2006 | Hoffman et al. |
| 7,004,389 B1 | 2/2006 | Robinson et al. |
| 7,082,415 B1 | 7/2006 | Robinson et al. |
| 7,152,045 B2 | 12/2006 | Hoffman |
| 7,152,047 B1 | 12/2006 | Nagel |
| 7,185,807 B1 | 3/2007 | Robinson et al. |
| 7,215,832 B1 | 5/2007 | Yamagichi |
| 7,236,610 B1 | 6/2007 | Luo et al. |
| 7,248,719 B2 | 7/2007 | Hoffman et al. |
| 7,269,737 B2 | 9/2007 | Robinson |
| 7,319,987 B1 | 1/2008 | Hoffman et al. |
| 7,367,049 B1 | 4/2008 | Robinson et al. |
| 7,373,330 B1 | 5/2008 | Klebe |
| 7,383,441 B2 | 6/2008 | Vorbruggen et al. |
| 7,387,240 B2 | 6/2008 | Ziegler |
| 7,389,269 B1 | 6/2008 | Robinson et al. |
| 7,437,330 B1 | 10/2008 | Robinson et al. |
| 7,464,059 B1 | 12/2008 | Robinson et al. |
| 7,483,862 B1 | 1/2009 | Robinson et al. |
| 7,497,372 B1 | 3/2009 | Robinson et al. |
| 7,502,761 B2 | 3/2009 | Siegal et al. |
| 7,512,567 B2 | 3/2009 | Bemmel et al. |
| 7,526,652 B2 | 4/2009 | Ziegler |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,545,621 B2 | 6/2009 | Haddad |
| 7,558,406 B1 | 7/2009 | Robinson et al. |
| 7,558,407 B2 | 7/2009 | Hoffman et al. |
| 7,565,329 B2 | 7/2009 | Lapsley et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,624,073 B1 | 11/2009 | Robinson et al. |
| 7,631,193 B1 | 12/2009 | Hoffman |
| 7,698,567 B2 | 4/2010 | Hoffman |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,778,933 B2 | 8/2010 | Robinson et al. |
| 7,831,468 B1 | 11/2010 | Conte et al. |
| 7,836,485 B2 | 11/2010 | Robison et al. |
| 7,882,032 B1 | 2/2011 | Hoffman |
| 7,970,678 B2 | 6/2011 | Lapsley |
| 8,015,118 B1 | 9/2011 | Robinson et al. |
| 8,200,980 B1 | 6/2012 | Robinson et al. |
| 2001/0051920 A1 | 12/2001 | Joao et al. |
| 2002/0024714 A1 | 2/2002 | Sandstrom et al. |
| 2002/0042884 A1 | 4/2002 | Wu et al. |
| 2002/0091642 A1 | 7/2002 | Rahnasto |
| 2002/0091646 A1* | 7/2002 | Lake ............... G06Q 20/04 705/67 |
| 2002/0152169 A1 | 10/2002 | Dutta et al. |
| 2003/0037261 A1 | 2/2003 | Meffert et al. |
| 2003/0061486 A1* | 3/2003 | Shibuya ........... G06Q 20/02 713/170 |
| 2003/0093790 A1 | 5/2003 | Logan et al. |
| 2003/0182246 A1 | 9/2003 | Johnson et al. |
| 2003/0233327 A1* | 12/2003 | Keresman, III ... G06Q 20/02 705/44 |
| 2004/0022444 A1 | 2/2004 | Rhoads |
| 2004/0073510 A1 | 4/2004 | Logal et al. |
| 2004/0117627 A1 | 6/2004 | Brewington |
| 2006/0106734 A1 | 5/2006 | Hoffman |
| 2006/0144925 A1* | 7/2006 | Jones ............... G06Q 20/40 235/380 |
| 2006/0265602 A1 | 11/2006 | Robinson |
| 2007/0154190 A1 | 7/2007 | Gilley et al. |
| 2007/0156696 A1 | 7/2007 | Lim |
| 2007/0162337 A1 | 7/2007 | Hawkins |
| 2007/0208662 A1 | 9/2007 | Jeronimus et al. |
| 2007/0226146 A1 | 9/2007 | Ruul |
| 2007/0282677 A1 | 12/2007 | Carpenter |
| 2007/0288319 A1 | 12/2007 | Robinson |
| 2007/0288320 A1 | 12/2007 | Cooper |
| 2008/0022416 A1 | 1/2008 | Yamauchi et al. |
| 2008/0097851 A1 | 4/2008 | Bemmel |
| 2008/0147481 A1 | 6/2008 | Robinson |
| 2008/0271116 A1 | 10/2008 | Robinson et al. |
| 2009/0070270 A1 | 3/2009 | Robinson et al. |
| 2009/0074256 A1 | 3/2009 | Haddad |
| 2009/0099944 A1 | 4/2009 | Robinson |
| 2009/0138366 A1 | 5/2009 | Bemmel |
| 2009/0156170 A1 | 6/2009 | Rossano et al. |
| 2009/0158136 A1 | 6/2009 | Rossano et al. |
| 2009/0177587 A1 | 7/2009 | Siegal |
| 2009/0228362 A1 | 9/2009 | Lapsley |
| 2010/0049659 A1 | 2/2010 | Cassone |
| 2012/0079581 A1 | 3/2012 | Patterson |
| 2013/0073463 A1 | 3/2013 | Dimmick |

FOREIGN PATENT DOCUMENTS

| | | |
|---|---|---|
| KR | 10-2005-0115104 A | 12/2005 |
| KR | 10-2007-0075983 A | 7/2007 |
| WO | 96/36934 A1 | 11/1996 |
| WO | 98/09227 A1 | 3/1998 |
| WO | 98/15924 A1 | 4/1998 |
| WO | 98/41947 A1 | 9/1998 |
| WO | 99/31621 A1 | 6/1999 |
| WO | 00/26849 A1 | 5/2000 |
| WO | 00/45247 A1 | 8/2000 |
| WO | 00/45320 A1 | 8/2000 |
| WO | 00/46710 A1 | 8/2000 |
| WO | 00/46737 A1 | 8/2000 |
| WO | 00/67187 A1 | 11/2000 |
| WO | 01/06440 A1 | 1/2001 |
| WO | 01/20531 A1 | 3/2001 |
| WO | 02/14984 A2 | 2/2002 |
| WO | 2005/098741 A2 | 10/2005 |

(56) References Cited

FOREIGN PATENT DOCUMENTS

WO    2007/092715 A2    8/2007
WO    2008/002979 A2    1/2008

OTHER PUBLICATIONS

International Search Report and Written Opinion dated Apr. 16, 2013 in PCT/US2012/072312, 10 pages.
International Search Report dated Apr. 27, 2012 in PCT/US2011/053103, 3 pages.
U.S. Appl. No. 10/678,646, filed Oct. 6, 2003; Robinson et al., 31 pages.
U.S. Appl. No. 10/725,394 (unpublished).
U.S. Appl. No. 10/891,503 (unpublished).
U.S. Appl. No. 11/076,851 (unpublished).
U.S. Appl. No. 11/304,786 (unpublished).

* cited by examiner

HOSTED THIN-CLIENT INTERFACE IN A PAYMENT AUTHORIZATION SYSTEM

CROSS-REFERENCES TO RELATED APPLICATIONS

The present non-provisional application claims benefit under 35 U.S.C. § 119 of U.S. Provisional Patent Application No. 61/582,202, filed on Dec. 30, 2011, and entitled "THIN CLIENT INTERFACE IMPLEMENTATION" which is herein incorporated by reference in its entirety for all purposes.

BACKGROUND

Limited access to financial services presents a problem for emerging markets which seek to empower its residents. For example, some markets may not have convenient access to banks or automatic teller machines (ATMs) for residents to manage their finances. One conventional method for accommodating such markets is the use of Micro ATMs which typically support branchless banking and may be located at various non-bank locations. However, certain types of merchants and value-added service (VAS) providers are not conventionally associated with these types of payment methods. For example, railways booking agencies, utility bill payment services, recurring bill payments, mobile top-up services, and the like, are not used in conjunction with conventional payment authorization systems, including those that are used with Micro-ATM services. Although Micro-ATM services can provide a convenient means for providing remote banking services to many that would otherwise not have access, conventional payment systems are proving inadequate in the modern economy.

Another problem to be solved relates to cumbersome authentication and payment processes. Conventional authentication and payment processes may involve the use of two or more systems with two or more message sets. A significant number of computing resources are required in conventional systems.

Embodiments of the invention address these and other problems, individually and collectively.

BRIEF SUMMARY

In certain embodiments, a singular-entity hosted server solution can be used to carry out banking services (e.g., or business correspondents, merchants, etc.) and value added services (e.g., ticket booking, merchant payment, etc.) that typical point-of-service (POS) devices cannot support. The system and methods described herein utilize existing infrastructure around payments and maximize the payment infrastructure as a shared resource.

One embodiment of the invention is directed to a method comprising receiving first transaction request data and biometric data at a host server computer from a client device, and transmitting an authorization request message comprising the biometric data to a central server computer. The central server computer communicates with an authentication server computer to validate the biometric data, sends the authorization request message to an issuer computer and receives an authorization response message from the issuer computer. The method also comprises receiving the authorization response message at the host server computer, and sending a service fulfillment request to a value added service (VAS) provider computer.

Another embodiment of the invention is directed to a host server computer comprising a processor and a computer-readable storage medium coupled to the processor. The computer readable storage medium comprising code executable by the processor for implementing a method comprising: receiving first transaction request data and biometric data at a host server computer from a client device; transmitting an authorization request message comprising the biometric data to a central server computer, wherein the central server computer communicates with an authentication server computer to validate the biometric data, sends the authorization request message to an issuer computer and receives an authorization response message from the issuer computer; receiving the authorization response message at the host server computer; and sending a service fulfillment request to a value added service (VAS) provider computer.

Another embodiment of the invention is directed to a method comprising receiving transaction request data, and transmitting a reversal request message comprising biometric data to a central server computer. The central server computer communicates with an authentication server computer to validate the biometric data and sends the reversal request message to an issuer computer. The central server computer receives a reversal request response message from the issuer computer. The method also includes receiving the reversal request response message.

Another embodiment of the invention is directed to a host server computer comprising a processor and a computer-readable storage medium coupled to the processor. The computer readable storage medium comprises code executable by the processor for implementing a method comprising: receiving transaction request data; transmitting a reversal request message comprising biometric data to a central server computer, wherein the central server computer communicates with an authentication server computer to validate the biometric data and sends the reversal request message to an issuer computer, and receives a reversal request response message from the issuer computer; and receiving the reversal request response message.

These and other embodiments of the invention are described in further detail below.

DETAILED DESCRIPTION

Figure 1:
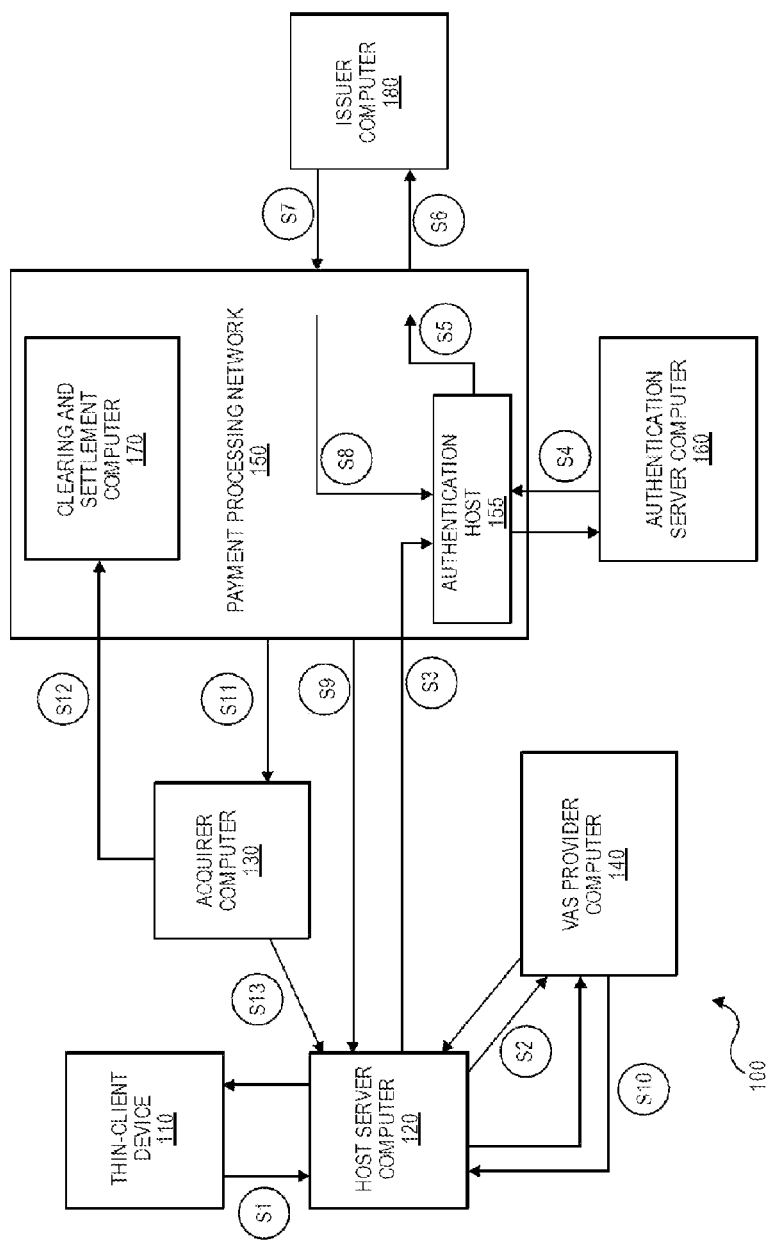
FIG. 1 is a simplified block diagram of a hosted solution for payments or purchases within a payment authorization system, according to an embodiment of the present invention.

Embodiments of the present invention relate to systems and methods authenticating a user and authorizing a transaction with a value added service provider in a payment authorization system.

In certain embodiments, a singular-entity hosted server solution can be used to carry out banking services (e.g., or business correspondents, merchants, etc.) and value added services (e.g., ticket booking, merchant payment, etc.) that typical point-of-service (POS) devices cannot support. The system and methods described herein utilize existing payment infrastructure and expands its use as a shared resource.

Embodiments of the invention have a number of technical advantages. In embodiments of the invention, a single host server computer may be used to coordinate both payments as well as provide an interface for value added services. In addition, by submitting authentication data and payment data in a single authorization request message, both authentication and payment authorization can take place using a single initial message format, thus saving on computing resources as compared to conventional authentication and authorization systems.

Prior to discussing the specific embodiments of the invention, a further description of some terms can be provided for a better understanding of embodiments of the invention.

An "acquirer" is a business entity (e.g., a commercial bank) that typically has a business relationship with the merchant and receives some or all of the transactions from that merchant.

An "authentication request message" can be a message that includes a user's identifying information. Typically, an authentication request message is used to perform a security function where a system may determine that a user is who they claim to be based on the user's identifying information. For example, an authentication request message may include a Universal Identification (UID) and user biometric data (e.g., fingerprints). In an embodiment, an identification system will receive the authentication request message and compare the UID and biometric data to a second set of biometric data to determine if there is a match between the two sets of data (i.e., a correlation within a predetermined degree of accuracy).

An "authentication response message" can be a message from an identification system that identifies whether a user is authenticated. Typically, the authentication response message is sent from an identification system to a payment processing network, an acquirer, or an issuer.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant. A "transaction response" may be an authorization response message in some embodiments of the invention.

"Biometric data" includes data that can be used to uniquely identify an individual based upon one or more intrinsic physical or behavioral traits. For example, biometric data may include fingerprint data and retinal scan data. Further examples of biometric data include digital photograph data (e.g., facial recognition data), deoxyribonucleic acid (DNA) data, palm print data, hand geometry data, and iris recognition data.

A "business correspondent" or "BC" may be an entity that has a contractual relationship or obligation with a financial institution or a payment processing network.

An "issuer" is a business entity which issues a payment device such as a payment card to a person. Typically, an issuer is a financial institution.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode.

A "payment product" may include a financial product used to effectuate a payment transaction. For example, a payment product may include a payment device (e.g., debit card, credit card, etc.). Typically, a payment product can include certain levels of benefits, rewards, interchange, and spend requirements, etc. Payment products can be issued by issuers.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

"Reversal request message" can include a message requesting that a previously completed transaction be canceled or reversed. A reversal request message may operate similarly to an authorization request message, but may indicate a request to reverse or cancel a transaction rather than to request to complete a transaction. As such, the reversal request message may require account data and biometric data to authorize the reversal and authenticate the user initiating the transaction.

"Reversal request response message" can include a message (e.g., by an issuer) indicating whether the reversal request (e.g., purchase cancellation) has been authorized.

A "server computer" can be a powerful computer or a cluster of computers. For example, the server computer can be a large mainframe, a minicomputer cluster, or a group of servers functioning as a unit. In one example, the server computer may be a database server coupled to a Web server. A "central server computer" can be a server computer that is centrally located, and may be part of a payment processing network in some embodiments of the invention.

"Service fulfillment request" can include a message sent to a VAS provider indicating that the transaction has been authorized (and the user authenticated), further requesting that the VAS provider fulfill the service to the user that initiated the transaction. For example, a user may make a request to book railway tickets from a VAS provider. After the user is authenticated and the transaction is authorized (i.e., the user has the requisite funds to complete the purchase), the VAS provider can then receive a service fulfillment request to complete the purchase and book the tickets.

A "terminal" (e.g. a point-of-service (POS) terminal) can be any suitable device configured to process payment transactions such as credit card or debit card transactions, or electronic settlement transactions, and may have optical, electrical, or magnetic readers for reading data from other portable consumer devices such as smart cards, keychain device, cell phones, payment cards, security cards, access cards, and the like.

A terminal may be in any suitable form. Some examples of terminals include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An terminal may use any suitable contact or contactless mode of operation to send or receive data from, or associated with, a payment device and/or a user mobile device. In some embodiments, where a terminal may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

A "thin-client" device can be a terminal in some cases, and may include a payment device reader, a biometric reader, and a printer, all coupled to a central processor and a memory. Alternatively or additionally, the thin-client device may comprise computer or computer program that primarily depends on another computer (its host or server computer) to execute its conventional computational requirements. The computer that depends on the host (e.g., server) computer can be a "client computer," "client device," or "thin-client." Other conventional names include "lean" or "slim" clients. The role provided by the server may vary in complexity, and may include simple storage functionality to complex information processing on the client's behalf. In conventional arrangements, a modern thin-client can be a simple computer terminal providing a graphical user interface (GUI) to the end user. The remaining functionality (e.g., the operating system) can be provided by the host server.

"Transaction request data" can include a request to initiate a transaction for payment of services. The transaction request data can include additional data that can be used to identify the user and the financial account to be associated with the transaction. For example, transaction request data may include biometric data of the user for user authentication and/or a primary account number (PAN) to identify the a financial account to be used in the transaction. The transaction data is typically formatted as an authorization request message as it is passed to the payment processing network for further transaction processing.

A "value added service provider" may comprise any suitable entity that provides services to users. Such services are typically not purely payment services. Such services include ticket booking services, mobile phone top-up services, utility bill services, insurance premium payment services, etc. Such services providers may operate computers that are remotely located with respect to a host server computer.

An "verification request message" can include a message sent to a value added service (VAS) provider to verify the legitimacy of that provider. For example, the verification request message may include a request for information and/or credentials from the VAS provider that can be used to prove their authenticity.

An "verification response message" can include a message originating from a VAS provider which may include information to verify the legitimacy of that provider. For example, the verification response message may include information (e.g., business credentials, records, account data, etc.) that can validate that the VAS provider is the business entity that they claim to be.

FIG. 1 is a simplified block diagram of a hosted solution for payments or purchases within a payment authorization system 100, according to an embodiment of the present invention. The system 100 includes a thin-client device 110, a host server computer 120, an acquirer computer 130, a value added service ("VAS") provider computer 140, a payment processing network 150, an identification system in the form of an authentication server computer 160, and an issuer computer 180. The payment processing network 150 includes an authentication host computer 155. Some embodiments of the hosted sever solution described herein may further include a POS device at host server 210. The components in FIG. 1 may all be in operative communication with each other.

In some embodiments, the host server computer 120 comprising a processor and a computer-readable storage medium coupled to the processor. The computer readable storage medium comprising code executable by the processor for implementing a method comprising: receiving first transaction request data and biometric data at a host server computer from a client device; transmitting an authorization request message comprising the biometric data to a central server computer, wherein the central server computer communicates with an authentication server computer to validate the biometric data, sends the authorization request message to an issuer computer and receives an authorization response message from the issuer computer; receiving the authorization response message at the host server computer; and sending a service fulfillment request to a value added service (VAS) provider computer.

As would be understood by one of ordinary skill in the art, any suitable communications protocol for storing, representing, and transmitting data between components in the system 100 may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format. Further, any suitable communication media may be used including the Internet.

A process flow can be described with reference to FIG. 1.

At s1, a user can swipe a payment device (not shown) at a thin-client device 110 (or otherwise cause the payment device to interact with the thin-client device 110) and transaction request data is sent to the host server 120. In some embodiments, the thin-client device 100 can be a computer that primarily depends on another computer (e.g., the host computer) to execute its conventional computation requirements. In some embodiments, the thin-client device 110 can be operated by a business correspondent (BC). The BC may have a contractual relationship or obligation with the payment processing network 140 (e.g., VisaNet™) or may be appointed by a bank (such as an issuer associated with the issuer computer 180) to provide access to banking including, but not limited to, taking deposits, dispensing cash for withdrawals, processing funds transfers, cancelling/reversing transactions, and answering balance inquiries.

At s2, the value added service (VAS) provider associated with the VAS provider computer 140 is validated. VAS providers may offer ticket booking services, mobile phone top-up services, utility bill payment services, insurance premium payment services, and the like. To validate the VAS provider computer 140, the host server 120 can generate and send a verification request message to the VAS provider computer 140 to validate its legitimacy. For example, the verification request message may include a request for information that can validate that the VAS provider associated with the VAS provider computer 140 is who they claim to be, and/or may include a request for information about the VAS provider. Once queried, the VAS provider computer 140 can generate and send back a verification response message that includes the requisite information (e.g., business records, account data, tax ID and records, etc.) to verify that the VAS provider is the business entity that they claim to be.

At s3, the user re-swipes the payment device and provides biometric data. The biometric data includes data that can be used to uniquely identify an individual based upon one or more intrinsic physical or behavioral traits. For example, biometric data may include fingerprint data, retinal scan data, and the like.

The biometric data may be provided to the thin client device 110 in any suitable manner. For example, the thin client device 110 may comprise a finger print scanner, a retinal scanner, or any other biometric data acquisition device. Any of these biometric data acquisition devices may obtain the user's biometric data and the biometric data may be digitized. Account data (e.g., a primary account number associated with a payment account) and the biometric data may then be transmitted to the thin-client device 110.

The host server 120 receives the account data and biometric data from the thin-client device 110, and generates an authorization request message. The host server 120 sends the authorization request message to the authentication host server 155. In alternative embodiments, the host server 120 can receive the account data (and/or biometric data) from the payment device at s1, such that two swipes (or other interaction types) are not required.

The authorization request message can include a request for authorization to conduct an electronic payment transaction. For example, it can include a request to an issuer to authorize payment to the VAS provider 140 to provide a product or service.

The account data can include a payment account number (PAN) including a bank identification number (BIN), or other account identifying data that can be used in payment transactions. The authorization request message generated and sent by the host server computer 110 can further include the above-described biometric data.

In some embodiments, the authentication host 155 can be part of or controlled by a payment processing network 150. A payment processing network 150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions, such as the transactions described herein. VisaNet™ in particular, includes a VIP system (Visa Integrated Payments system), which processes authorization requests and a Base II system (clearing and settlement computer 170) which performs clearing and settlement services. Alternatively, the authentication server computer 155 can be operated by a third party entity.

At s4, the authentication host 155 transmits the biometric data and payment account data to the authentication server computer 160, and the authentication server computer 160 can respond by transmitting a message that indicates whether or not the biometric data corresponds to the submitted payment account data. In some cases, the biometric data and account data can be sent to the authentication server 160 in the form of an authentication request message. In further embodiments, a universal identification number (UID) can be derived or cross-referenced from the payment account data at the payment processing network 150, authentication host 155, or other entity, and sent to the authentication server 160. The authentication host 155, in conjunction with authentication server 160, determines if the user is authenticated based on a predetermined correlation between the UID and biometric information provided by the user, and a UID and biometric information stored by the authentication server 160 (or other entity in communication therewith). In some embodiments, a different server (not shown) of payment processing network 150 may determine if the user is authenticated. Authentication may be based on a variety of information including whether the UID and biometric are correlated (as determined by the authentication server 160) or other criteria (e.g., location of transaction site, payment device transaction history, etc.).

A predetermined correlation, as described herein, can be a relationship between received input data and stored data. In the context of the present invention, the received input data can be a BIN, PAN, or UID and biometric data from a user, according to an embodiment. For example, the stored data can be a previously stored UID or BIN and biometric data of the user. The predetermined correlation can be a previously set threshold that identifies or quantifies how much the received input data and the previously stored input data should match. If the received input data and the previously stored input data match according to the predetermined threshold or "correlation," then the data is considered a match. For example, fingerprints contain a certain number of identifying features. If a high number of identifying features of a fingerprint are matched to a stored fingerprint, then the probability that both fingerprints are from the same person may be high. Similarly, if few identifying features match between the two fingerprints, then the probability that they are from the same person is low. This concept can be applied to other biometric data (e.g., retinal scans). In the context of the present invention, a predetermined correlation can be a matching criterion between one set of a UID and biometric data and a second set of a UID and biometric data, as further described below.

At s5, once the user is authenticated (i.e., the user is who they claim to be), the payment transaction is routed internally within the payment processing network 150. The payment processing network 150 can include a payments system which can process authorization request messages.

At s6, the payment processing network 150 routes the authorization request message to the issuer computer 180 for approval. In some embodiments, the issuer computer 180 is configured to receive the authorization data from the payment processing network 150. The issuer computer 180 determines if the user is authorized to perform a given financial transaction (e.g., cash deposit/withdrawal, money transfer, balance inquiry). For example, the issuer can determine if the user has enough money to pay the VAS provider associated with the VAS provider computer 140 for the good or service requested. In some embodiments, the issuer may consider other factors in determining whether to authorize the financial transaction. For example, a user's geographic location, a transaction amount, transaction history, the result of the authentication, or other metrics may be used as would be appreciated by one of ordinary skill in the art with the benefit of this disclosure.

At s7, according to certain embodiments, the issuer computer 180 generates and transmits an authorization response message to the payment processing network 150. The authorization response message includes an indication regarding whether or not the transaction is authorized or not authorized by the issuer.

At s8, the authorization response message is routed to the authentication host 155.

At s9, the authentication host 155 (or payment processing network 150) sends the authorization response to the host server computer 120, and then to the thin client device 110. The authorization and authentication process is completed and a receipt can be printed by the thin client device 110.

At s10, a service fulfillment request can be sent to the VAS provider computer 140. A service fulfillment request can include a message sent to the VAS provider computer 140 (e.g., by the host server) indicating that the transaction has been authorized (and the user authenticated), further requesting that the VAS provider computer 140 fulfill the service (e.g., ticket bookings) to the user that initiated the transaction. The VAS provider computer 140 can then respond accordingly by informing the user and the thin client device 110 that the service will be or has been fulfilled.

At s11, the payment processing network 150 can send data to the acquirer 130 for clearing and settlement of the transaction. An acquirer 130 can an entity with which the business correspondent (operating the thin-client device) has a contractual relationship and receives some or all of the transactions from that BC.

At s12, interchange processing and settlement occurs (via the clearing and settlement computer 170).

Finally, at s13, the acquirer computer 130 settles with the BC for cash transactions via the thin client device 110 and the transaction is completed.

Figure 2:
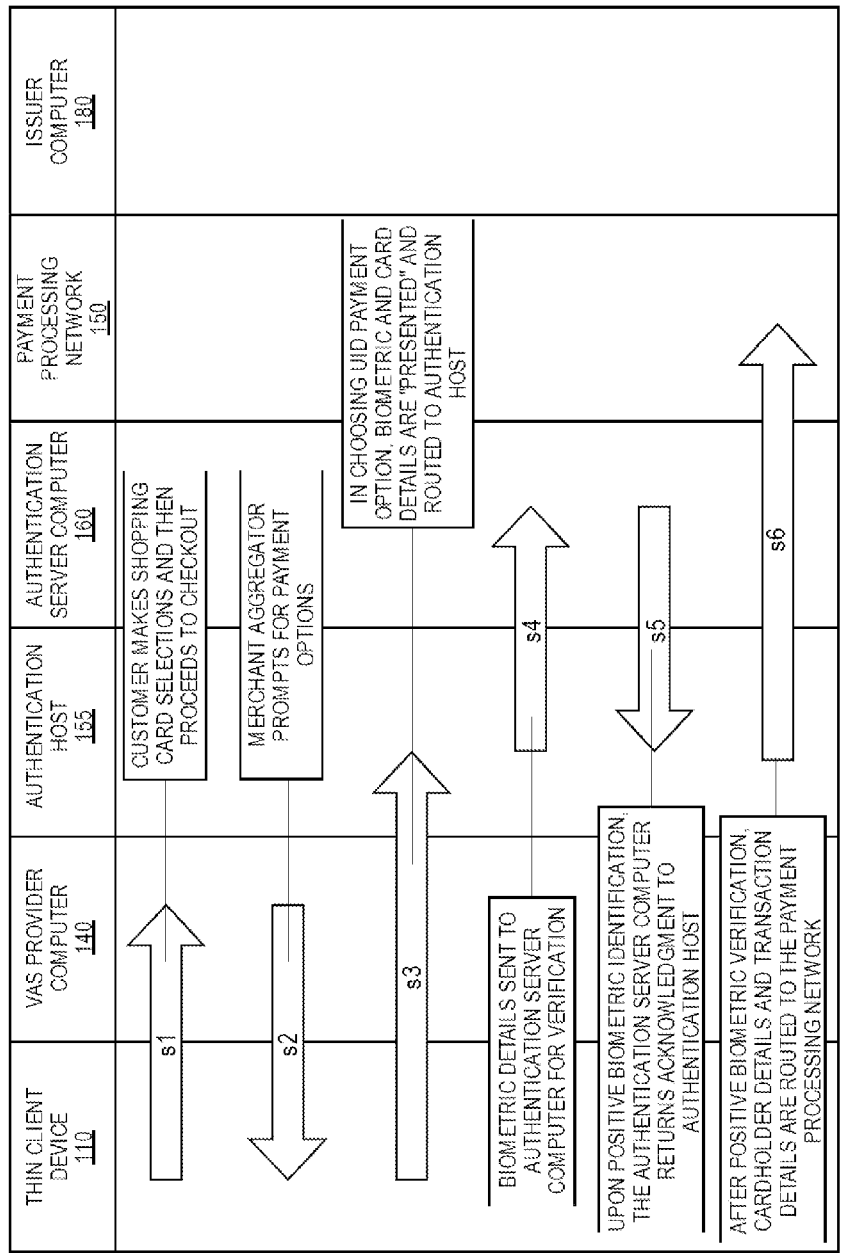
FIG. 2 is a simplified flow diagram illustrating a method of an exemplary UID transaction flow within a payment authorization system, according to an embodiment of the present invention.
Figure 2:
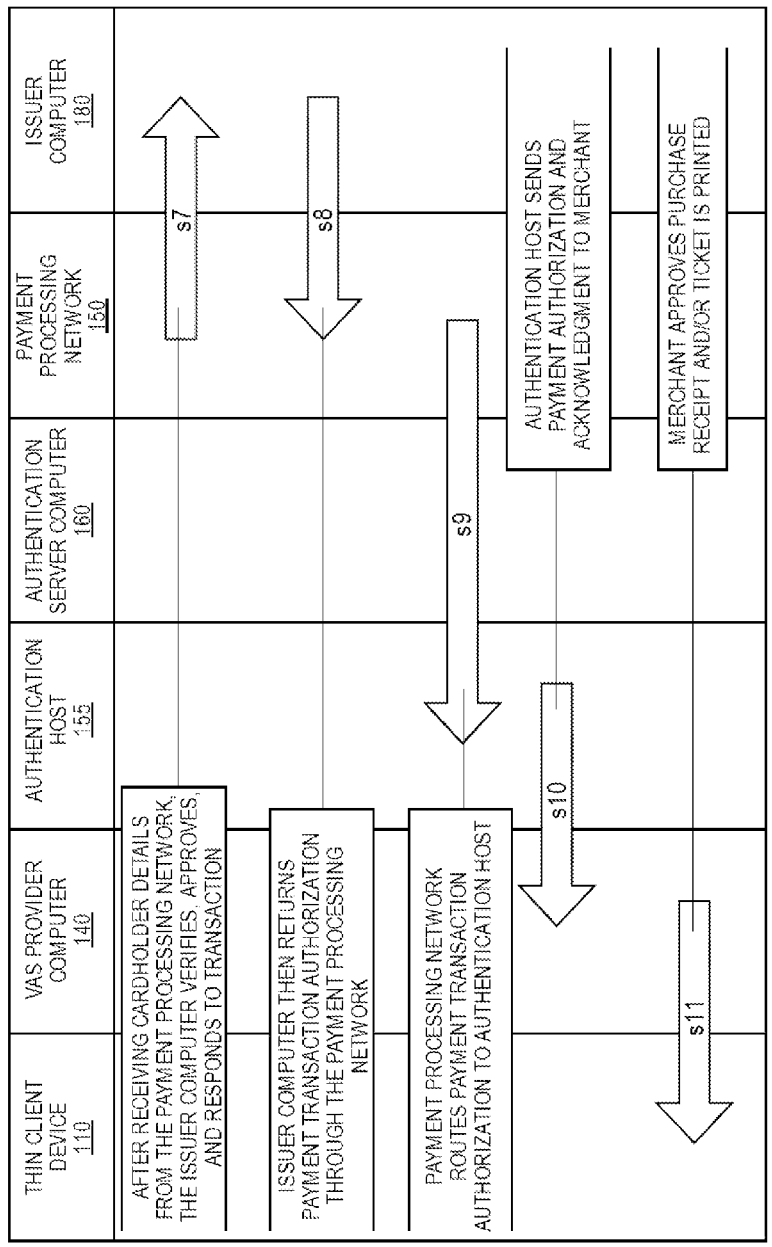

FIG. 2 is a simplified flow diagram illustrating a method 200 of an exemplary UID transaction flow within a payment authorization system 100, according to an embodiment of the invention. Method 200 depicts a successful transaction scenario within the payment processing system 100. The method has some similarity to the processes described with reference to FIG. 1.

At s1, a user using a thin-client device 110 makes shopping cart selections at a merchant website (i.e., at a VAS service provider computer 140) and proceeds to checkout. In some cases, the thin-client device 110 may be a terminal computer (e.g., mobile or otherwise) with a graphical user interface (GUI) and may be configured such that primary computational operations are performed by a host server computer 120, similar to the thin-client configuration described above with respect to FIG. 1. The merchant can be an aggregator, VAS provider (e.g., railroad ticket vendor), or any suitable merchant.

At s2, the merchant via the VAS provider computer 140 prompts the user for payment options. For example, payment options may include payments made by credit card, debit card, gift card, or any suitable payment device. In addition, a user may also select payment options with different levels of security. For example, a user may opt to choose a UID payment option, which requires both account data and biometric data, as described above.

At s3, the user chooses the UID payment option and presents biometric and payment card details as explained above. This data is routed from the thin-client device 110, through host server computer 120, and to the authentication host 155. The payment card data and biometric data can be provided in an authorization request message.

At s4, the biometric details are sent by the authentication host 155 to the authentication server computer 160 for verification. As discussed above, the authentication server 160 may compare the biometric data provided by the user with biometric data stored in a local database to determine if they match according to a predetermined correlation. In some embodiments, account data or a universal identifier may be used in the authentication process, as described above.

At s5, after determining if there is a positive correlation, the authentication server 160 returns an acknowledgement to the authentication host 155.

At s6, if a positive authentication is established, the cardholder details and transaction details are routed to the payment processing network 150 configured to process authorization request messages. If a negative authentication is returned, the user may be offered additional opportunities to resubmit biometric data, or the transaction may be canceled. In such cases, the user may be notified via the thin-client device. Furthermore, the VAS provider, host server, issuer, payment processing network, or any other entity can receive notice for security purposes, fraud tracking and protection, account or payment device black or white listing, or the like.

At s7, the issuer computer 180 receives the cardholder details from the payment processing network 150, the issuer 180 verifies, approves, and responds to the authorization request message.

At s8, the issuer computer 180 generates an authorization response message including a payment transaction authorization decision indicator. It is routed through the payment processing network 150.

At s9, the payment processing network 150 routes the payment transaction authorization (i.e., authorization response message) to the authentication host server 155.

At s10, the authentication host 150 sends the authorization response message to the VAS provider computer 140. In some embodiments, the authentication host server 155 sends the payment authorization response to the VAS provider computer 140 through the host server 120. In further embodiments, the payment processing network 150 may pass the authorization response message directly to the VAS provider computer 140, bypassing the authentication host 155.

At s11, the VAS provider 140 approves the purchase and a receipt and/or a ticket is printed at the client device 110. Clearing and settlement processes continue as discussed above with respect to FIG. 1.

Figure 3:
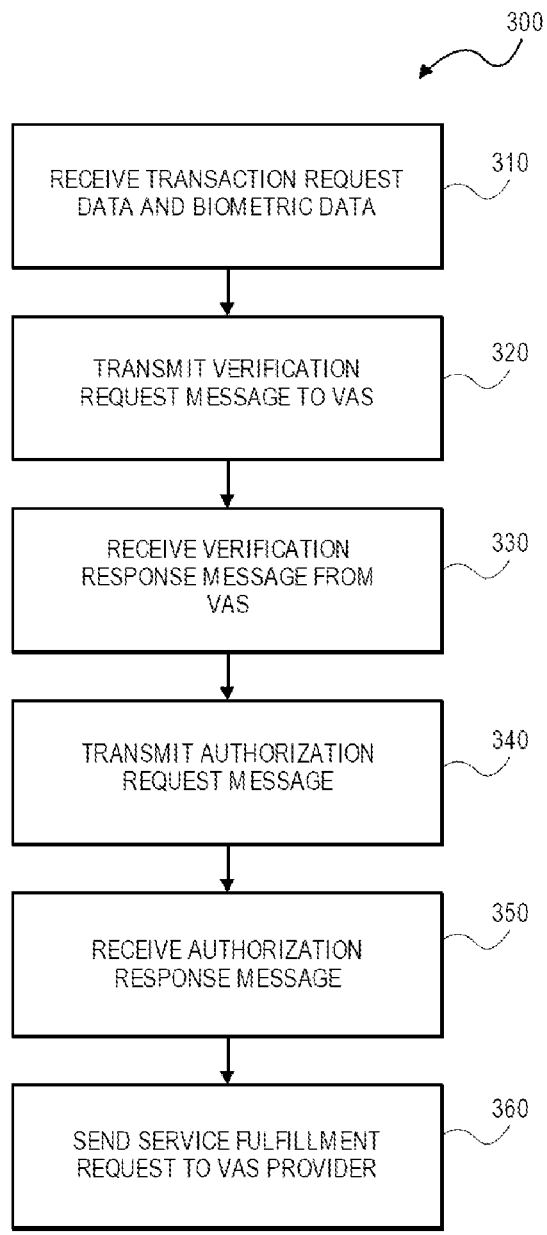
FIG. 3 is a simplified flow diagram illustrating a method for making payments or purchases within a payment authorization system, according to an embodiment of the present invention.

FIG. 3 is a simplified flow diagram illustrating a method 300 for making payments or purchases within a payment authorization system 100, according to an embodiment of the present invention. Method 300 can be performed by processing logic that may comprise hardware (circuitry, dedicated logic, etc.), software (such as is run on a general purpose computing system or a dedicated machine), firmware (embedded software), or any combination thereof. In one embodiment, the method 300 can be performed by the host server computer 120 of FIG. 1.

Method 300 begins with the host server 120 receiving transaction request data and biometric data from a client device 110 to pay a Value-Added Service ("VAS") provider 140 (s310) for a good or service. For example, a user may wish to pay their utility bill. The user can engage the client device 110, which may include a user-friendly GUI or other suitable interface to allow a user to initiate a payment transaction with the desired VAS provider 140. Alternatively, the client-device 110 may be operated by a business correspondent or agent thereof to assist the user initiate a transaction. Once the user selects the desired VAS provider 140 to pay, the thin-client device 110 can collect account data (e.g., BIN, PAN, etc.) and biometric data (e.g., fingerprint) from the user for the transaction request data. The transaction request data can be transmitted to the host server 120 in any suitable format as would be appreciated by one of ordinary skill in the art with the benefit of this disclosure.

At s320, the host server 120 generates and transmits a verification request message to the VAS provider 140 to verify its authenticity and/or to request information from the VAS provider 140. In the latter case, the VAS provider 140 may simply be requested to provide a listing of products (e.g., tickets, services, etc.) to be offered to the user for purchase. As described above, a VAS provider can include any number of merchants, entities, or providers including, but not limited to, ticket booking services, mobile phone top-up services, insurance premium payment services, utility bill payment services (as described here), recurring bill payments, and the like. The verification request message may be transmitted in any suitable format.

At s330, the host server 120 receives a verification response message from the VAS provider 140. The VAS provider can provide any type of data that may be used to verify the legitimacy of their business. For example, the VAS provider computer 140 may provide business credentials, account records, tax information, or other suitable form of identification. It may also return information on products that can be sold by the VAS provider. The VAS provider computer 140 can format the verification response message in any suitable format as would be appreciated by one of ordinary skill in the art with the benefit of this disclosure.

At s340, the host server 120 transmits an authorization request message to the payment processing network 150 for authorization of the transaction. In some embodiments, the authorization request message may include an authentication request message, including account data and biometric data, as discussed above with respect to FIG. 1. In each case, the issuer 180 receives the authorization request message via the payment processor 150 and/or authentication host 155, authorizes the transaction, generates an authorization response message indicating that the transaction has been authorized, and sends the authorization response message to the host server 120 via the payment processing network 150 and/or authentication host 155.

At s350, the host server 120 receives an authorization response message indicating that the transaction has been authorized. The authorization and authentication process is completed and a receipt can be printed at the thin-client device. At s360, the host server 120 sends a service fulfillment request to the VAS provider 140. A service fulfillment request can include a message sent to the VAS provider 140 (e.g., by the host server) indicating that the transaction has been authorized (and the user authenticated), further requesting that the VAS provider 140 fulfill the utility service payment initiated by the user.

It should be appreciated that the specific steps illustrated in FIG. 3 provide a particular method of processing a payment transaction with a VAS provider with a hosted thin-client interface, according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 300.

Figure 4:
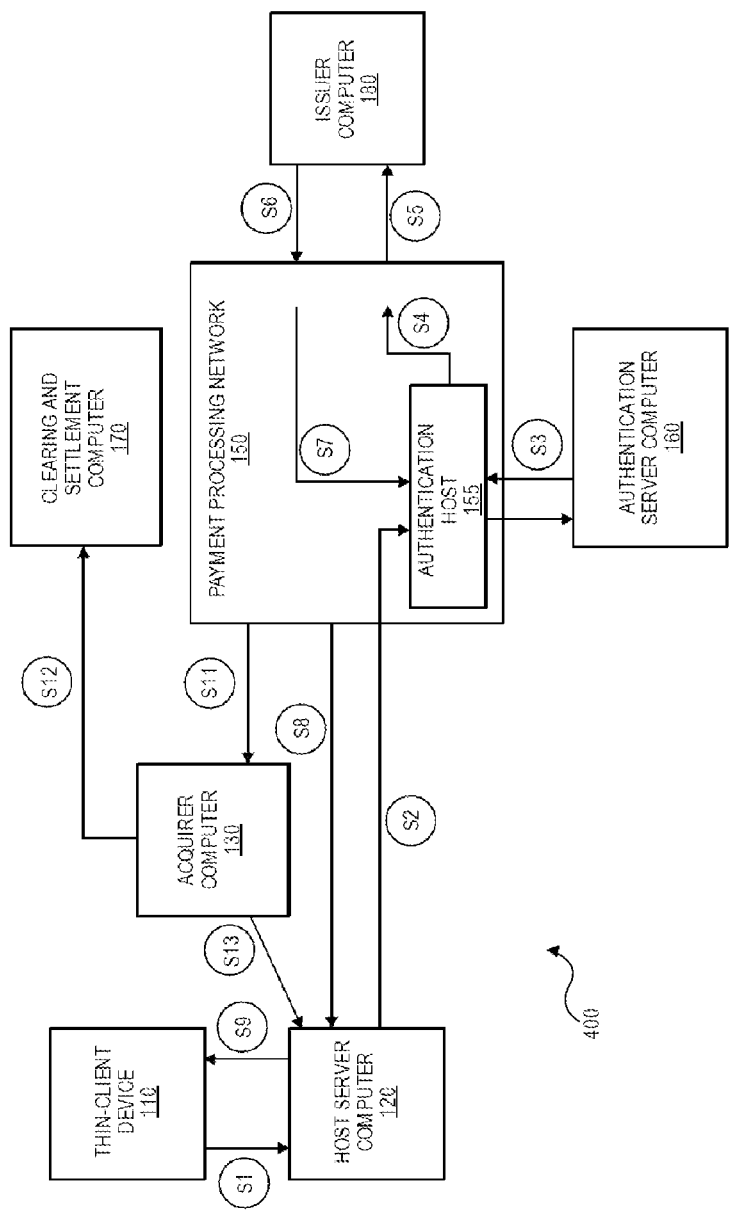
FIG. 4 illustrates a simplified block diagram of a hosted solution for a reversal or cancellation of a transaction within a payment authorization system, according to an embodiment of the invention.

FIG. 4 illustrates a simplified block diagram of a hosted solution for a reversal or cancellation of a transaction within a payment authorization system, according to an embodiment of the invention. The system 400 includes a thin-client device 110, a host server computer 120, an acquirer computer 130, a payment processing network 150, an authentication server computer 160, and an issuer computer 180. The payment processing network 150 includes an authentication host 155.

In some embodiments, the host server computer 120 comprises a processor and a computer-readable storage medium coupled to the processor. The computer readable storage medium comprises code executable by the processor for implementing a method comprising: receiving transaction request data; transmitting a reversal request message comprising biometric data to a central server computer, wherein the central server computer communicates with an authentication server computer to validate the biometric data and sends the reversal request message to an issuer computer, and receives a reversal request response message from the issuer computer; and receiving the reversal request response message.

A process flow can be described with reference to FIG. 4.

At s1, a user begins the transaction reversal process by swiping a payment device 110 (e.g., the payment card used in the transaction) at a thin-client device 110, and further provide biometric data. A business correspondent (BC) or agent thereof operates the thin-client device. The BC may have a contractual relationship or obligation with the payment processing network 140 (e.g., VisaNet™) or may be appointed by a bank to provide access to banking including, but not limited to, taking deposits, dispensing cash for withdrawals, processing funds transfers, canceling transactions, and answering balance inquiries.

The BC provides a transaction identification number for the previous transaction that the user wishes to cancel. The transaction identification can be included on the transaction receipt. Transaction request data, which can include the user account data, biometric data, and the transaction identification number of the previous transaction, are sent to the host server computer 120.

At s2, a reversal request message is sent from the host server 120 to the authentication host computer 155 of the payment processing network 150. A reversal request message may operate similarly to an authorization request message, but may indicate a request to reverse or cancel a transaction rather than a request to complete a transaction. The reversal request message can include account data and biometric data to authorize the reversal and authenticate the user initiating the reversal transaction. In some embodiments, the account data and biometric data can be formatted in an authentication request message. The biometric data can include data that can be used to uniquely identify an individual based upon one or more intrinsic physical or behavioral traits. For example, biometric data may include fingerprint data, retinal scan data, and the like.

At s3, the authentication host 155 sends the biometric data and payment account data to the authentication server computer 160. In some cases, the biometric data and account data can be sent to the authentication server 160 in the form of an authentication request message. In further embodiments, a universal identification number (UID) can be derived or cross-referenced from the payment account data at the payment processing network 150, authentication host 155, or other entity, and sent to the authentication server 160. The authentication host 155, in conjunction with authentication server 160, determines if the user is authenticated based on a predetermined correlation between the UID and biometric information provided by the user, and a UID and biometric information stored by the authentication server 160 (or other entity in communication therewith). In some embodiments, a different server (not shown) of payment processing network 150 may determine if the user is authenticated. Authentication may be based on a variety of information including whether the UID and biometric are correlated (as determined by the authentication server 160) or other criteria (e.g., location of transaction site, payment device transaction history, etc.).

A predetermined correlation, as described herein, can be a relationship between received input data and stored data. In the context of the present invention, the received input data can be a BIN, PAN, or UID and biometric data from a user, according to an embodiment. For example, the stored data can be a previously stored UID or BIN and biometric data of the user. The predetermined correlation can be a previously set threshold that identifies or quantifies how much the received input data and the previously stored input data should match. If the received input data and the previously stored input data match according to the predetermined threshold or "correlation," then the data is considered a match. For example, fingerprints contain a certain number of identifying features. If a high number of identifying features of a fingerprint are matched to a stored fingerprint, then the probability that both fingerprints are from the same person may be high. Similarly, if few identifying features match between the two fingerprints, then the probability that they are from the same person is low. This concept can be applied to other biometric data (e.g., retinal scans). In the context of the present invention, a predetermined correlation can be a matching criterion between one set of a UID and biometric data and a second set of a UID and biometric data, as further described below.

At s4, upon confirmation that the user is authenticated, the reversal request message is routed to the payment processing network 150. The payment processing network 150 can include a payments system which can process authorization request messages.

At s5, the payment processing network 150 routes the transaction reversal request message to the issuer 180 for approval. In this case, the issuer computer 180 decides whether to authorize the transaction reversal in question.

At s6, the issuer 180 generates and sends a transaction reversal response message to the payment processing network 150. The transaction reversal response message indicates whether the transaction reversal is authorized or declined.

At s7, the transaction reversal response message is routed to the authentication host computer 155. Alternatively, the transaction reversal response message can be routed to the payment processing network 150 or an entity associated therewith.

At s8, the authentication host computer 155 (or payment processing network 150) sends the transaction reversal response message to the host server computer 120.

At s9, the client device 110 receives an indication that the transaction reversal process and authentication process are complete and a receipt for the reversal can be printed by the client device 110.

At s11, the payment processing network 150 can send data to the acquirer computer 130 for clearing and settlement of the transaction.

At s12, interchange processing and settlement occurs (via clearing and settlement computer 170).

Finally, at s13, the acquirer computer 130 settles with the operator (e.g., BC) of the thin-client device 110.

Figure 5:
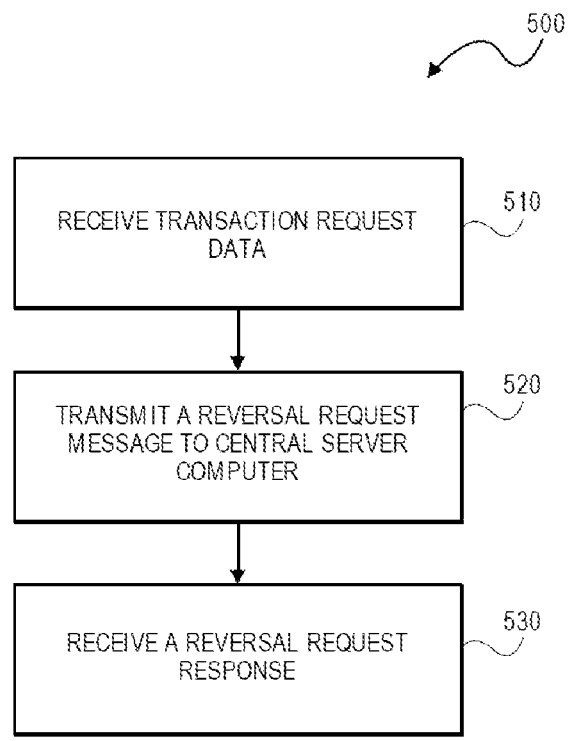
FIG. 5 is a simplified flow diagram illustrating a method for reversing or cancelling a transaction within a payment authorization system, according to an embodiment of the present invention.

FIG. 5 is a simplified flow diagram illustrating a method 500 for reversing or cancelling a transaction within a payment authorization system 400, according to an embodiment of the present invention. Method 500 can be performed by processing logic that may comprise hardware (circuitry, dedicated logic, etc.), software (such as is run on a general purpose computing system or a dedicated machine), firmware (embedded software), or any combination thereof. In one embodiment, method 500 is performed by the host server 120 of FIG. 4.

Method 500 begins with the host server computer 120 receiving transaction request data from a client device 110 to cancel or reverse a previous transaction (s510). For example, a user may wish to cancel a payment for railway tickets. The user can engage the client device 110, which may include a user-friendly GUI or other suitable interface to allow a user to initiate the reversal process. In some embodiments, the client-device 110 may be operated by a business correspondent or agent thereof to help the user initiate the reversal process. The transaction request data can be transmitted to the host server 120 in any suitable format and can include account data (PAN, BIN, etc.) and biometric data (fingerprint data, retina data, etc.).

At s520, the host server 120 generates and transmits a reversal request message and sends it to a central server computer for authentication and authorization of the transaction. In some embodiments, the central server computer may include the authentication host 155, payment processing network 150, or other entity that can be controlled or operated by the payment processing network 150. After the user is authenticated by the authentication host 155 and authentication server 160, the issuer 180 receives the reversal request message and determines if the user is authorized to perform the transaction reversal. In some embodiments, the issuer 180 may consider other factors in determining whether to authorize the reversal transaction. For example, a user's geographic location, a transaction amount, transaction history, the result of the authentication, or other metrics may be used. The issuer 180 generates an authorization response message and sends it back to the host server computer 120 through the payment processing network 150, as described above with respect to FIG. 4.

At s530, the host server computer 120 receives the reversal request response message. The reversal request response message indicates whether the request to reverse the transaction was authorized by the issuer 180.

It should be appreciated that the specific steps illustrated in FIG. 5 provide a particular method of reversing a transaction in a hosted thin-client based payment transaction system 400, according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 500.

Figure 6:
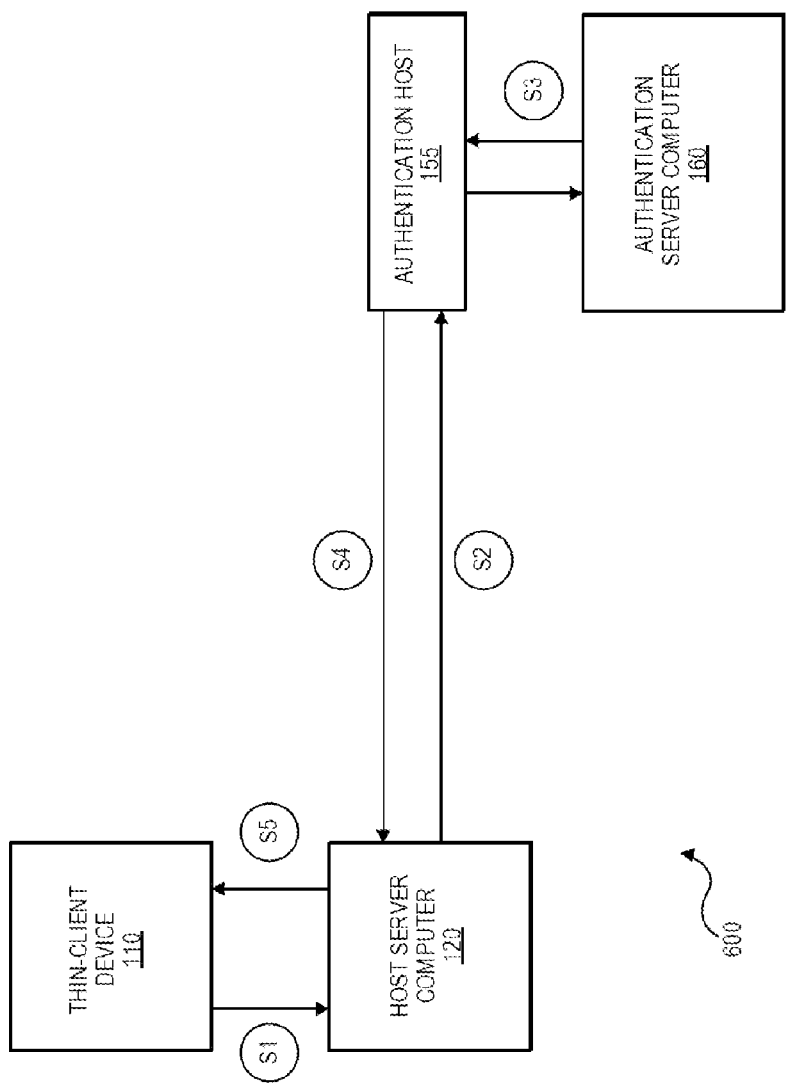
FIG. 6 is a simplified block diagram of a hosted solution for third-party deposits within a payment authorization system, according to an embodiment of the present invention.

FIG. 6 is a simplified block diagram of a hosted solution for third-party deposits within a payment authorization system 600, according to one embodiment of the present invention. The system 400 includes a thin-client device 110, a host server 120, an acquirer 130, a payment processing network 150, an authentication server 160, and an issuing bank ("issuer") 180. The remaining systems and subsystems (e.g., payment processing network 150, acquirer 130, etc.) are part of payment authorization system 600 but are not shown so as to simplify the process.

At s1, once prompted by a GUI or suitable user interface, a user begins the third party deposit process and sends a transaction request message to the host server 120 via thin-client device 110. In some embodiments, the thin-client device may be operated by a business correspondent or agent thereof. In such case, the BC enters the intended receiver's account number (e.g., card number), biometric data, and amount for the third party transaction when prompted by the hosted server solution 120.

At s2, the host server computer 120 sends a deposit transaction message to the authentication host 155 for authentication processing. The deposit transaction message can include account data (BIN, PAN, etc.) and biometric data, along with deposit data indicating the deposit amount.

At s3, the authentication server 160 verifies if the receiving account (e.g., receiver card number) is present in a mapping file. If the card number is present in the mapping file, then an "approved" response is returned to the client device 110 via host server 120 (s4).

At s5, the issuer (not shown) responds to the authenticated transaction, as would be understood by one or ordinary skill in the art.

Figure 7:
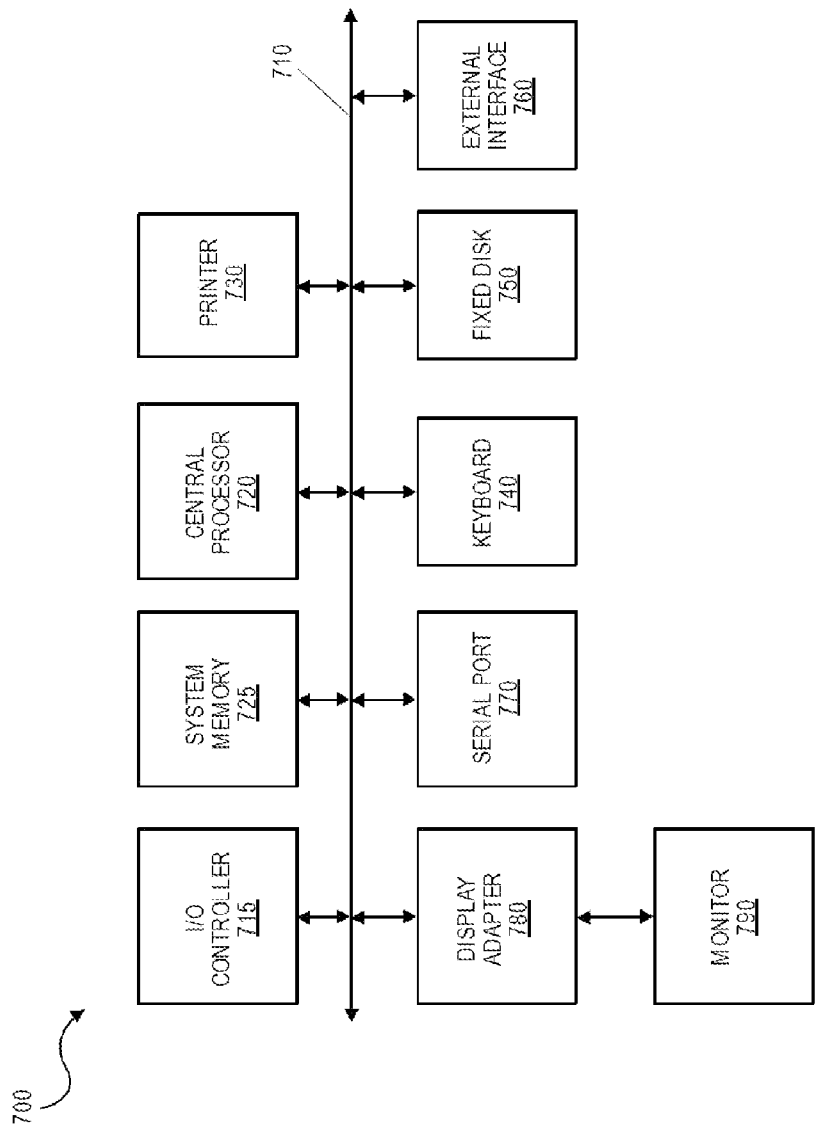
FIG. 7 is a diagram of a computer apparatus, according to an embodiment of the present invention.

FIG. 7 is a diagram of a computer apparatus 700, according to an example embodiment. The various participants and elements in the previously described system diagram (e.g., the host server, authentication host, authentication server, payment processing network, issuing bank, etc., in FIG. 1) may use any suitable number of subsystems in the computer apparatus to facilitate the functions described herein. Examples of such subsystems or components are shown in FIG. 7. The subsystems shown in FIG. 7 are interconnected via a system bus 710. Additional subsystems such as a printer 730, keyboard 740, fixed disk 750 (or other memory comprising computer-readable media), monitor 790, which is coupled to display adapter 780, and others are shown. Peripherals and input/output (I/O) devices (not shown), which couple to I/O controller 715, can be connected to the computer system by any number of means known in the art, such as serial port 770. For example, serial port 770 or external interface 760 can be used to connect the computer apparatus to a wide area network such as the Internet, a mouse input device, or a scanner. The interconnection via system bus allows the central processor 720 to communicate with each subsystem and to control the execution of instructions from system memory 725 or the fixed disk 750, as well as the exchange of information between subsystems. The system memory 725 and/or the fixed disk 750 may embody a computer-readable medium.

Figure 8:
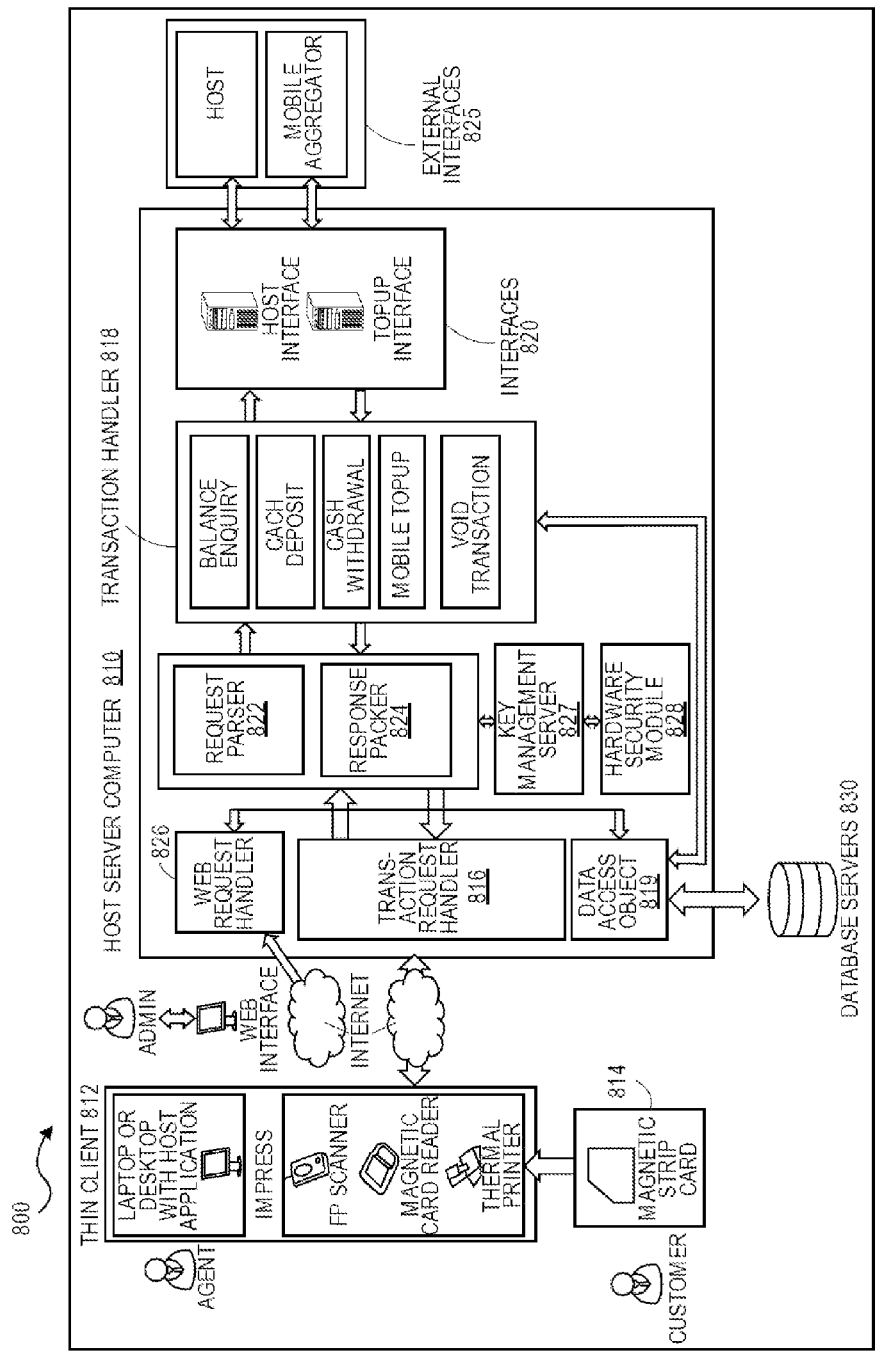
FIG. 8 is a block diagram illustrating other system components, according to an embodiment of the invention.

FIG. 8 shows a system diagram with more detailed views of some system components. FIG. 8 shows a host server computer 810 which communicates with various external interfaces 825 and database servers 830, as well as a thin-client device 812 via communication networks such as the Internet. A payment device such a magnetic strip card 814 (or any suitable payment device) can interact with the thin-client device 812.

The host server computer 810 may comprise a number of components including a Web request handler 826, a transaction request handler 816, a request parser 822, a response packer 824, a key management system (KMS) 827, a hardware security module 828, a transaction handler 818 (which comprises a balance enquiry module, a cash deposit module, a cash withdrawal module, a mobile top up module, and a void transaction module), and a number of interfaces including an authentication host interface, a top up interface, etc. A value added service provider computer interface (not shown) may also be provided.

In embodiments of the invention, a J2EE based web application provides an interface to exchange messages between the client application on the thin client device 812 and the host server computer 810. The typical functionality of the web server module on the host server computer 810 can be to interface with the client to receive a request, perform a first level of validation, parse and send them to further level of processing and sending back the responses to the client application. In some embodiments, all transactions can initiate from the client application on the thin-client device 812 and can pass through the host server computer 810.

The request handler 816 handles the various requests coming from the thin-client application on the thin-client device 812. It decrypts the data with the use of KMS 827 and parses it using request parser 822. It then forwards the request to the transaction handler 818.

The transaction handler 818 receives the transaction request from the request handler 816 and identifies the request type. Based on the request type it forwards the request to the corresponding interfaces.

The transaction interfaces 820 can include an authentication host interface, which communicates with the authentication host server to verify the customer's finger print biometric data against the UID. The transaction interfaces 820 may also provide for a top-up interface which communicates with the mobile aggregator interface to do the mobile top up. The transaction interfaces may also provide a biller interface, which communicates with the biller aggregator, or the like, when the customer requests for utility bill payment. Other interfaces may be included for enabling recurring bill payments.

The external interfaces 825 use the authentication host to verify customer data such as UID and finger print biometric data, and the mobile aggregator interface is used for mobile top-up by connecting to the mobile aggregator with mobile top-up parameters such as operator name, mobile number and top-up amount. A railway and bus ticketing gateway interface is used for fetching the travel booking details for bus and railway. This provides the details like train no, journey date, source and destination stations, fare details, ticketing availability and class details to the customer. A biller interface provides the top-up amount details from related service provider for which the customer has made a top-up request. It will be updated for all the transaction.

The web request handler 826 handles the request coming from the web interface based on the type of the request it processes the data and communicates with the DAO (data access object) 819. The DAO 819 provides the layer for all the data base operations for the user, agent, device and transaction data and data access can be made through an Oracle/SQL Server.

Examples of various transactions that can be performed using embodiments of the invention are listed below.

Cash Deposit—A customer (an example of a user) can deposit cash to his account through the thin client application. The customer's biometric data gets verified against UID and after successful verification the amount is credited to customer's account.

Cash Withdraw—A customer can withdraw cash from his account through the thin client application. The customer's biometric data gets verified against UID and after successful verification the amount is debited from customer's account and agent handover the same amount to customer.

Balance Inquiry—A customer can check their account balance through the thin client application. The customer's biometric data gets verified against UID and after successful verification the application displays the customer's account balance.

Mobile top-up—A customer can top-up his mobile device using this option. The customer selects the operator and enters the details like mobile number and the denomination. On receiving the transaction request, the middleware server sends the customer biometric data to the authentication host for verification and payment. Upon a successful payment response, the host server computer 810 server sends the mobile top-up request to the mobile aggregator for the top-up process to complete.

Ticketing—The customer can book a bus or railway ticket through the thin client application on the client device 812 by providing the basic travel details such as journey date, source station, destination station, train no and class details. The thin client application can interact with the ticketing interface and fetch the details like train number, journey date, ticket availability, fare details, class details, etc. The agent swipes the customer card and then captures the customer biometric data. The captured details are sent to the host server computer 810. It then sends the request to the authentication host for customer UID verification and payment. On successful verification and payment, it sends the ticketing request to the ticketing vendor along with ticket booking details and the payment status. The vendor sends the reservation details to the customer through e-mail. Upon a successful response from ticketing vendor, the host server computer 810 ends the response to thin-client application. The transaction response is then printed.

Utility Bill Payment—The customer can pay his utility bills through thin client application by entering his bill details like consumer no, account no and biller name. The host server computer 810 receives the customer's billing details and interacts with biller interface to fetch the bill amount. Then it forwards the bill amount to the thin client application. The thin client application asks the customer to confirm payment by entering the bill amount. The customer then needs to swipe his cards and place his finger on a scanner when a red light associated with the scanner glows. After all of the data is captured successfully, it is sent to the server. It will verify the necessary details and send them to the authentication host for further verification and payment. The biller is then updated about the status of the transaction. Also, a response is sent to the thin client application. Finally a print out of the transaction is taken and shared between the agent and the customer. It should be understood that utility bill payments are but one of many possible uses of the thin-client application. Other bill payments such as recurring bill payments and the like, can be performed using embodiments of this invention.

Re-set Password—The agents can re-set their password by sending the reset password request to the admin manually and admin has to set the reset flag with use of the web interface functionality for the specific requested agent and after that agent can reset their password with use of client application.

Change Password—The agents can change their password by selecting the change password option form the menu after login to the client application, after verification of the old password with existing database. The agent will be able to change their password successfully.

$3^{rd}$-Party Deposits—$3^{rd}$ party deposits allow the customer to deposit cash to their friends/relatives card within same bank with the use of thin client application. The receiver's card number is verified by the authentication server.

Money Transfers—Money transfers are similar to $3^{rd}$ party deposits but allows for interbank payments using existing payment processor network (PPN) infrastructure and allowing a "thin client" implementation to "plug-in" to the PPN infrastructure.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   receiving, by a host server computer from a client device, first transaction request data for a transaction between a user of the client device and a value added service provider, the first transaction request data including an account identifier of an account of the user of the client device involved in the transaction, an amount of the transaction, and biometric data of the user;
   transmitting, by the host server computer, a verification request message to a value added service provider computer of the value added service provider, the verification request message requesting verification data for verifying the authenticity of the value added service provider;
   receiving, by the host server computer, a verification response message from the value added service provider computer, the verification response message including the verification data;
   verifying, by the host server computer, the authenticity of the value added service provider using the verification data included in the verification response message;
   generating, by the host server computer, an authorization request message for the transaction, the authorization request message including the account identifier of the account of the user, the amount of the transaction, the biometric data of the user, and a request for authorization to conduct the transaction for the amount of the transaction using the account of the user;
   transmitting, by the host server computer after the verifying of authenticity of the value added service provider, the authorization request message including the account identifier of the account of the user, and the amount of the transaction, the biometric data of the user, and the request for authorization to conduct the transaction to a central server computer, wherein the central server computer communicates with an authentication server computer to validate the biometric data of the user, wherein the central server computer sends the authorization request message including the account identifier of the account of the user, the amount of the transaction, the biometric data of the user, and the request for authorization to conduct the transaction to an issuer computer associated with the account of the user, and wherein the central server computer receives an authorization response message from the issuer computer indicating that the transaction has been authorized by the issuer computer based on the biometric data of the user, the account identifier of the user, and the amount of the transaction;
   receiving, by the host server computer, the authorization response message from the central server computer indicating that the transaction has been authorized by the issuer computer based on the biometric data of the user, the account identifier of the user, and the amount of the transaction; and
   sending, by the host server computer after the receiving of the authorization response message indicating that the transaction has been authorized by the issuer computer, a service fulfillment request to the value added service provider computer including a request to fulfill the transaction with the value added service provider and an indication that the transaction has been authorized by the issuer computer.

2. The method of claim 1 wherein the value added service provider is a service provider including one of a ticket booking service, mobile top-up service, or utility payment service.

3. The method of claim 1 wherein the host server computer provides a graphical user interface to be displayed on the client device to provide an interface with the value added service provider computer.

4. The method of claim 1 wherein the biometric data includes one or more of finger print data or retinal scan data.

5. The method of claim 1 wherein the authorization request message is in ISO 8583 standard format, wherein the authorization request message further comprises a card verification value, an expiration date, a merchant identifier, and a merchant location.

6. The method of claim 1 wherein the verification data of the verification response message received from the value added service provider computer includes at least one of a credential, a record, account data, and a list of products or services.

7. A host server computer comprising:
   a processor and a computer-readable storage medium coupled to the processor, the computer readable storage medium comprising code executable by the processor for implementing a method comprising:
   receiving, by the host server computer from a client device, first transaction request data for a transaction between a user of the client device and a value added service provider, the first transaction request data including an account identifier of an account of the user of the client device involved in the transaction, an amount of the transaction, and biometric data of the user;
   transmitting, by the host server computer, a verification request message to a value added service provider computer of the value added service provider, the verification request message requesting verification data for verifying the authenticity of the value added service provider;

receiving, by the host server computer, a verification response message from the value added service provider computer, the verification response message including the verification data;

verifying, by the host server computer, the authenticity of the value added service provider using the verification data included in the verification response message;

generating, by the host server computer, an authorization request message for the transaction, the authorization request message including the account identifier of the account of the user, the amount of the transaction, the biometric data of the user, and a request for authorization to conduct the transaction for the amount of the transaction using the account of the user;

transmitting, by the host server computer after the verifying of authenticity of the value added service provider, the authorization request message including the account identifier of the account of the user, the amount of the transaction, the biometric data of the user, and the request for authorization to conduct the transaction for the amount of the transaction using the account of the user to a central server computer, wherein the central server computer communicates with an authentication server computer to validate the biometric data of the user, wherein the central server computer sends the authorization request message including the account identifier of the account of the user, the amount of the transaction, the biometric data of the user, and the request for authorization to conduct the transaction to an issuer computer associated with the account of the user, and wherein the central server computer receives an authorization response message from the issuer computer indicating that the transaction has been authorized by the issuer computer based on the biometric data of the user, the account identifier of the user, and the amount of the transaction;

receiving, by the host server computer, the authorization response message from the central server computer indicating that the transaction has been authorized by the issuer computer based on the biometric data of the user, the account identifier of the user, and the amount of the transaction; and sending, by the host server computer after the receiving of the authorization response message indicating that the transaction has been authorized by the issuer computer, a service fulfillment request to the value added service provider computer including a request to fulfill the transaction with the value added service provider and an indication that the transaction has been authorized by the issuer computer.

8. The server computer of claim 7 wherein the value added service provider is a service provider including one of a ticket booking service, mobile top-up service, or utility service.

9. The server computer of claim 7 wherein the server computer provides a graphical user interface to be displayed on the client device to provide an interface with the value added service provider computer.

10. The server computer of claim 7 wherein the biometric data includes one or more of finger print data or retinal scan data.

* * * * *